(12) United States Patent
Isogai

(10) Patent No.: US 7,295,680 B2
(45) Date of Patent: Nov. 13, 2007

(54) EMBEDDING AND DETECTING DIGITAL WATERMARK IN IMAGE

(75) Inventor: Taichi Isogai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 294 days.

(21) Appl. No.: 10/948,564

(22) Filed: Sep. 24, 2004

(65) Prior Publication Data

US 2005/0180594 A1 Aug. 18, 2005

(30) Foreign Application Priority Data

Feb. 17, 2004 (JP) ............................. 2004-040224

(51) Int. Cl.
*G06K 9/00* (2006.01)
*H04N 7/00* (2006.01)
*H04N 11/00* (2006.01)

(52) U.S. Cl. ...................... 382/100; 348/461; 348/463; 348/465

(58) Field of Classification Search ................. 382/103
See application file for complete search history.

(56) References Cited

U.S. PATENT DOCUMENTS

| 5,915,027 A * | 6/1999 | Cox et al. ...................... 380/54 |
| 6,477,431 B1 * | 11/2002 | Kalker et al. .................. 700/39 |
| 6,505,223 B1 * | 1/2003 | Haitsma et al. ............. 708/403 |
| 6,671,388 B1 * | 12/2003 | Op De Beeck et al. .... 382/100 |
| 6,947,573 B2 * | 9/2005 | Linnartz ..................... 382/100 |
| 7,127,065 B1 * | 10/2006 | Depovere et al. ........... 380/201 |

FOREIGN PATENT DOCUMENTS

| JP | 2000-151984 | 5/2000 |
| JP | 2000-224408 | 8/2000 |
| JP | 2002-271606 | 9/2002 |
| JP | 2003-143559 | 5/2003 |
| JP | 3431593 | 5/2003 |
| JP | 2003-219141 | 7/2003 |

OTHER PUBLICATIONS

Lin, Spatial Synchronization Using Watermark Key Structure; SPIE vol. 5306 Jan. 19, 2004, pp. 2-3.*

* cited by examiner

*Primary Examiner*—Joseph Mancuso
*Assistant Examiner*—Nathan Bloom
(74) *Attorney, Agent, or Firm*—Finnegan, Henderson, Farabow, Garrett & Dunner, L.L.P.

(57) ABSTRACT

An apparatus for embedding digital watermark information in an image, includes an image divider dividing the image into a plurality of partial images; and an embedder embedding in each of the partial images a digital watermark which indicates the digital watermark information. The digital watermark includes a plurality of watermark elements arranged in a sequence which is different for each of the partial images.

18 Claims, 14 Drawing Sheets

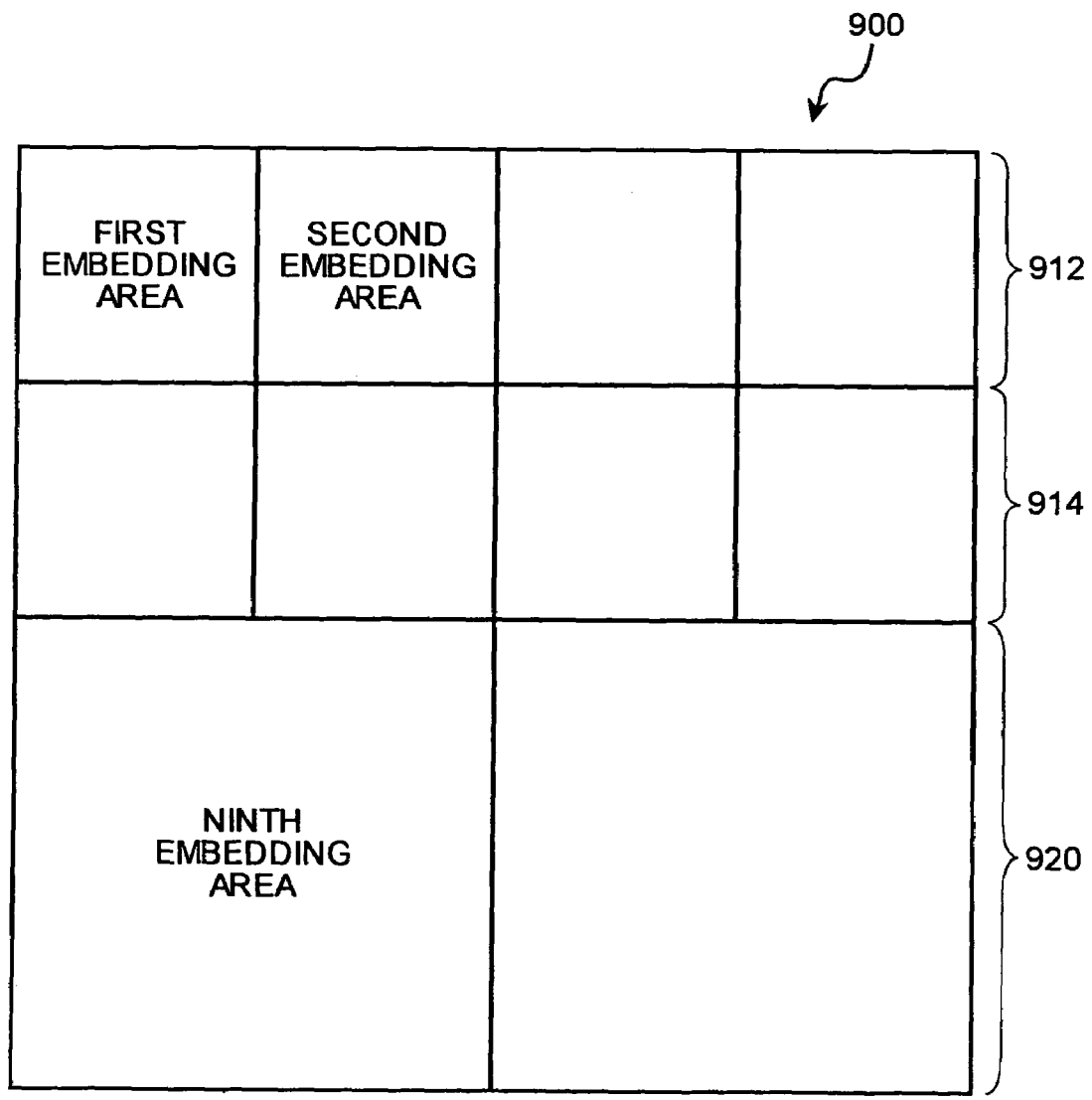

FIG.10A

| 1 | 2 | 3 | 4 |
|---|---|---|---|
| 5 | 6 | 7 | 8 |
| 9 |   | 10 |  |

| 2 | 3 | 4 | 5 |
|---|---|---|---|
| 6 | 7 | 8 | 9 |
| 10 |  | 1 |  |

| 3 | 4 | 5 | 6 |
|---|---|---|---|
| 7 | 8 | 9 | 10 |
| 1 |  | 2 |  |

← 970

EMBEDDING AND DETECTING DIGITAL WATERMARK IN IMAGE

CROSS-REFERENCE TO RELATED APPLICATIONS

This application is based upon and claims the benefit of priority from the prior Japanese Patent Application No. 2004-40224 filed on Feb. 17, 2004 the entire contents of which are incorporated herein by reference.

BACKGROUND OF THE INVENTION

1) Field of the Invention

The present invention relates to an apparatus for and a method of embedding and detecting digital watermark information in an image.

2) Description of the Related Art

Digital watermarking for embedding another kind of information by adding to digital contents a small modification such that deterioration is indistinctive is heretofore known. As an application example of the digital watermarking, examples of embedding information for identifying a writer and information for certifying the ownership are known. Other than this, application techniques of digital watermark are proposed for copy control, finger printing, authentication of contents, and broadcast monitoring.

A digital watermark embedding method is also proposed. For example, a method of embedding watermark information both in the space direction and the time direction is known. According to this method, even when a part of the image is cut out, watermark information embedded in other parts can be extracted (see for example, Japanese Patent Application Laid-Open No. 2003-143559).

As another example, when embedding repetitive watermarks in which a unit watermark is repeated vertically and horizontally, a method is known in which the unit watermark is shifted by a certain amount in the horizontal direction for each line. According to this method, since repetition of the unit watermark is not constant, there is an effect that an attack against the watermark becomes difficult (see for example, Japanese Patent Application Laid-Open No. 2000-151984).

In the above digital watermark embedding method, however, when one of the watermark information is specified, there is a possibility of attack against the watermark information. Further, when a part of the image is cut out, there is a problem in that the watermark information cannot be detected, unless at least one of various kinds of information embedded in the image is completely left.

SUMMARY OF THE INVENTION

It is an object of the present invention to at least solve the problems in the conventional technology.

An apparatus for embedding digital watermark information in an image according to one aspect of the present invention includes an image divider dividing the image into a plurality of partial images, and an embedder embedding in each of the partial images a digital watermark which indicates the digital watermark information. The digital watermark includes a plurality of watermark elements arranged in a sequence which is different for each of the partial images.

An apparatus for detecting a digital watermark information embedded in an image according to another aspect of the present invention includes a receiver receiving an image which includes a plurality of partial images each embedded with a digital watermark. The digital watermark indicates the digital watermark information, and includes a plurality of watermark elements arranged in a sequence which is different for each digital watermark. The apparatus also includes a detector detecting the watermark elements from each partial image; a storage unit storing the watermark elements detected; and a watermark information restorer restoring the watermark information, based on the watermark elements detected from the partial images, of the watermark elements stored in the storage unit.

A method of embedding digital watermark information in an image according to still another aspect of the present invention includes dividing the image into a plurality of partial images; and embedding in each of the partial images a digital watermark which indicates the digital watermark information. The digital watermark includes a plurality of watermark elements arranged in a sequence which is different for each of the partial images.

A method of detecting digital watermark information embedded in an image according to still another aspect of the present invention includes receiving an image which includes a plurality of partial images each embedded with a digital watermark, the digital watermark indicating digital watermark information and including a plurality of watermark elements arranged in a sequence which is different for each digital watermark; detecting the watermark elements from each partial image; storing the watermark elements detected; and restoring the digital watermark information, based on the watermark elements detected from the partial images, of the watermark elements stored.

The computer program product according to still another aspect of the present invention causes a computer to perform the method according to the present invention.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 9 depicts a still image according to another modification of the digital watermark embedding apparatus;

FIG. 10A depicts first watermark information according to the another modification;

FIG. 10B depicts second watermark information according to the another modification;

FIG. 10C depicts third watermark information according to the another modification;

DETAILED DESCRIPTION

Exemplary embodiments of a digital watermark embedding apparatus, a digital watermark detector, a digital watermark embedding method, a digital watermark detecting method, a digital watermark embedding program, and a digital watermark detecting program will be explained below with reference to the accompanying drawings. The present invention is not limited by the embodiments.

Figure 1:
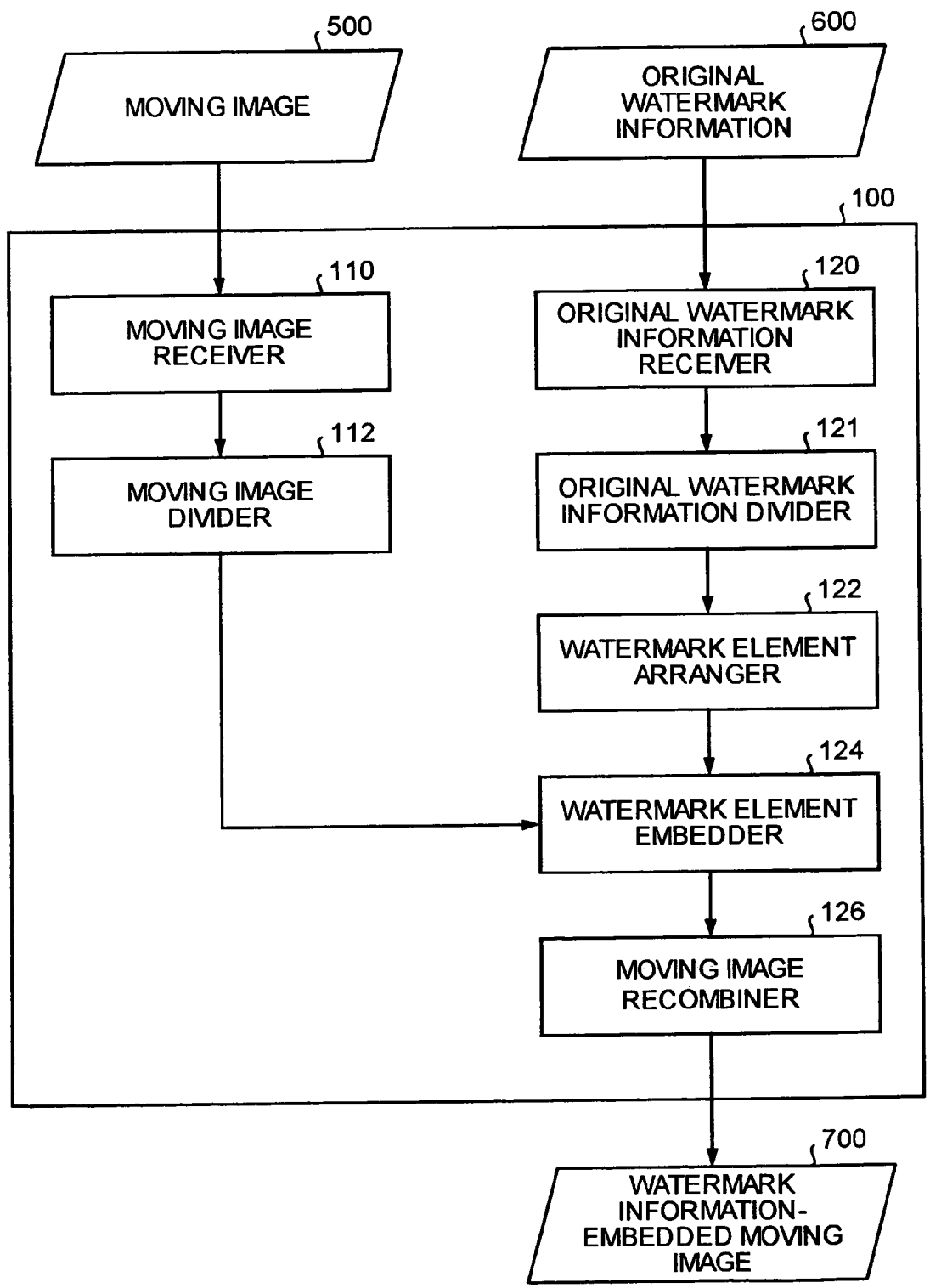
FIG. 1 is a block diagram of a digital watermark embedding apparatus according to a first embodiment.

FIG. 1 is a block diagram of a functional configuration of a digital watermark embedding apparatus 100 according to a first embodiment. The digital watermark embedding apparatus 100 embeds original watermark information 600 in a moving image 500. The digital watermark embedding apparatus 100 includes a moving image receiver 110, a moving image divider 112, an original watermark information receiver 120, an original watermark information divider 121, a watermark element arranger 122, a watermark element embedder 124, and a moving image recombiner 126.

The moving image divider 112 divides the moving image 500 obtained by the moving image receiver 110 into a plurality of areas, that is, embedding areas.

Figure 2:
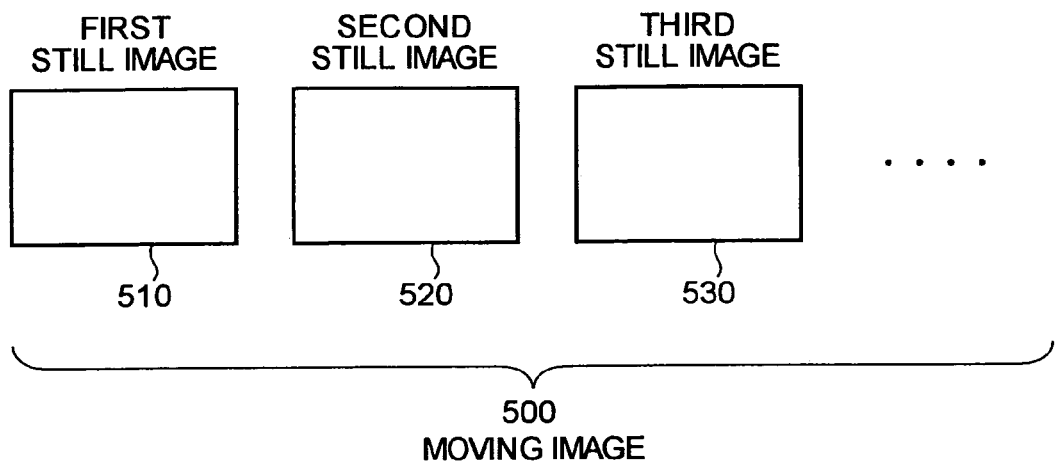
FIG. 2 is a schematic diagram of a data configuration of a moving image.
Figure 3:
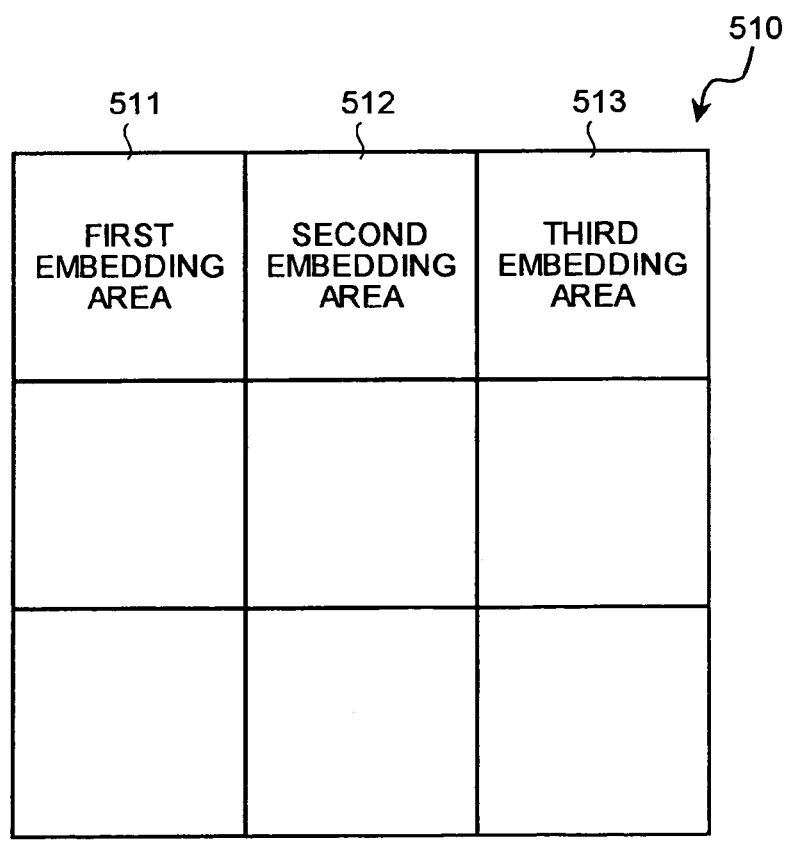
FIG. 3 is a schematic diagram of a data configuration of a first still image included in the moving image shown in FIG. 2.

The processing by the moving image divider 112 will be explained in detail with reference to FIGS. 2 and 3. FIG. 2 is a schematic diagram of a data configuration of the moving image 500. FIG. 3 is a schematic diagram of a data configuration of a first still image 510 included in the moving image 500 shown in FIG. 2.

As shown FIG. 2, the moving image 500 includes a plurality of still images 510, 520, 530, and the like. As shown in FIG. 3, the first still image 510 is divided vertically and horizontally at equal intervals. That is, the first still image 510 has a plurality of embedding areas. Specifically, the first still image 510 has the embedding areas having the same shape such as a first embedding area 511, a second embedding area 512, a third embedding area 513, and the like. For the brevity of explanation, an example in which the first still image is divided into nine embedding areas will be explained herein.

The data configuration of other still images 520, 530, and the like are the same as that of the first still image 510 shown in FIG. 3.

The still image according to the embodiment respectively corresponds to a partial image described in the appended claims.

When having obtained the moving image 500, the moving image divider 112; cuts respective still images 510, 520, 530, and the like out from the moving image 500. The moving image divider 112 further divides the respective still images 510, 520, 530, and the like into a plurality of embedding areas.

Figure 4:
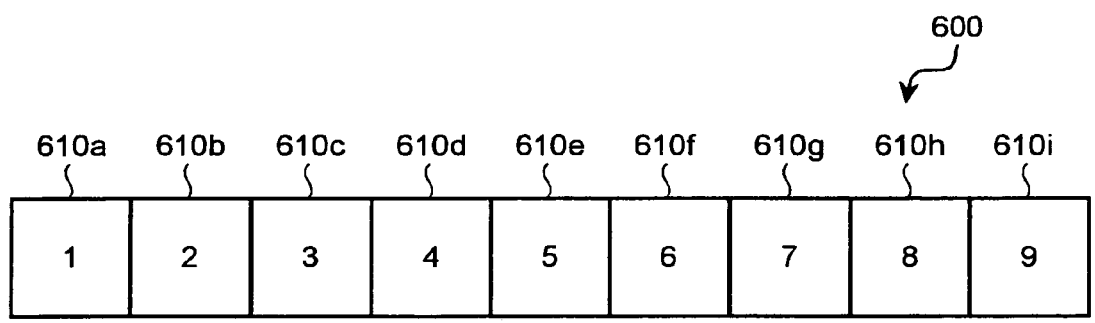
FIG. 4 is a schematic diagram of a data configuration of watermark information.

On the other hand, the original watermark information receiver 120 shown in FIG. 1 obtains original watermark information 600 from outside. The original watermark information divider 122 divides the original watermark information 600 obtained by the original watermark information receiver 120 into various kinds of information. The processing by the original watermark information divider 121 will be explained in detail with reference to FIG. 4. FIG. 4 is a schematic diagram of the data configuration of the original watermark information. The original watermark information is divided into a plurality of watermark elements by the original watermark information divider 121. In this embodiment, the original watermark information divider 121 divides one original watermark information into nine watermark elements, that is, a first watermark element 610a to a ninth watermark element 610i. The original watermark information divider 121 divides the original watermark information 600 into watermark elements of the same number as that of the embedding areas divided by the moving image divider 112.

The first to the ninth watermark elements 610a to 610i according to the embodiment are figures from one to nine. That is, the original watermark information according to the embodiment is expressed in a continuous number array from one to nine.

It is desired that the number of watermark elements and the number of embedding areas included in the still image be the same. Therefore, the number of divisions in the still image, that is, the number of embedding areas may be determined based on the number of divisions in the original watermark information. Further, the number of divisions in the original watermark information, that is, the number of watermark elements may be determined based on the number of divisions in the still image.

The watermark element arranger 122 shown in FIG. 1 determines the sequence of the watermark elements divided by the original watermark information divider 121. The watermark element arranger 122 according to the embodiment creates the watermark information to be embedded in the respective still images by differentiating the sequence of the watermark elements 610a to 610i (a common order) included in the original watermark information 600.

Figure 5A:
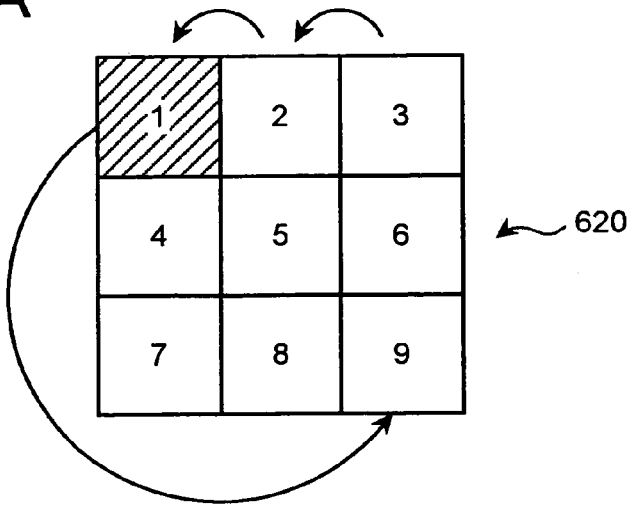
FIG. 5A depicts first watermark information created by a watermark element arranger.
Figure 5B:
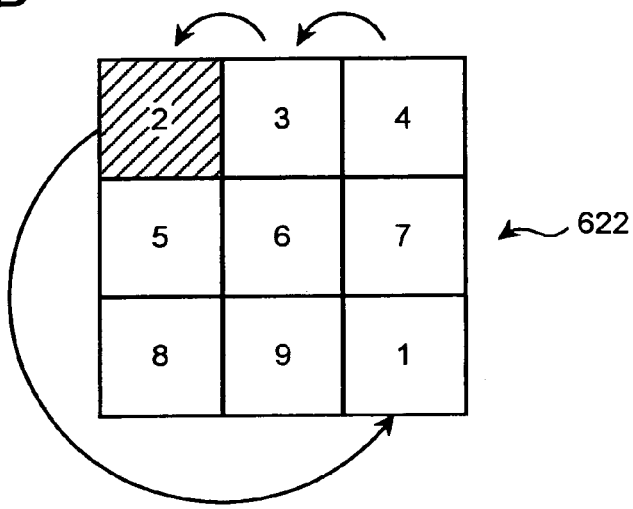
FIG. 5B depicts second watermark information created by the watermark element arranger.
Figure 5C:
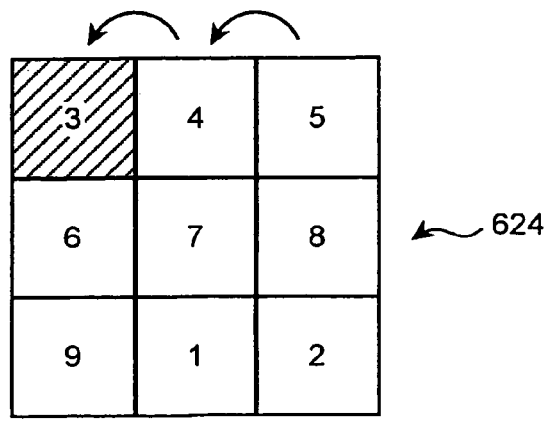
FIG. 5C depicts third watermark information created by the watermark element arranger.

The processing by the watermark element arranger 122 will be explained in detail with reference to FIGS. 5A to 5C. FIGS. 5A to 5C depict three types of watermark information created by the watermark element arranger 122. In each of three watermark information 620, 622, and 624 shown in FIGS. 5A to 5C, the first watermark element 610a to the ninth watermark element 610i included in the original watermark information 600 are arranged. However, the sequence thereof is different.

The first watermark information 620 has the first watermark element 610a at the top. After the first watermark element 610a, the second watermark element 610b, the third watermark element 610c, . . . , and the ninth watermark element 610i follow in the sequence of the watermark elements in the original watermark information 600.

The second watermark information 622 has the second watermark element 610b at the top. After the second watermark element 610b, the third watermark element 610c, the fourth watermark element 610d, . . . , and the ninth watermark element 610i follow in the sequence of the watermark elements in the original watermark information 600. Then, the first watermark element 610a follows the ninth watermark element 610i.

The third watermark information 624 has the third watermark element 610c at the top. After the third watermark element 610c, the fourth watermark element 610d, the fifth watermark element 610e, . . . , and the ninth watermark element 610i follow in the sequence of the watermark elements in the original watermark information 600. Then, the first and the second watermark elements 610a and 610b follow the ninth watermark element 610i.

The watermark element arranged at the top in the first watermark information 620, the second watermark information 622, and the third watermark information 624, respectively, is shifted by one to the back of the array.

When the top position in the respective first, second, and third watermark information 620, 622, and 624, that is, the watermark element arranged in the first embedding area is sequentially arranged, the watermark element at the top is different. However, the sequence of the watermark elements is the same as that of the watermark elements in the original watermark information 600. Likewise, in other embedding areas, the sequence of the watermark elements is the same as that of the watermark elements in the original watermark information 600.

The watermark elements embedded in the respective watermark information are arranged in order from upper left in the horizontal direction, according to the sequence in the original watermark information 600.

In the respective watermark information, the sequence in the original watermark information 600 is maintained. Further, the sequence in the original watermark information 600 is held according to the sequence of the various kinds of watermark information.

The watermark element arranger 122 creates the watermark information by shifting by one the watermark element to be arranged at the top, while maintaining the sequence of the first to the ninth watermark elements 610a to 610i in the original watermark information 600.

Figure 6A:
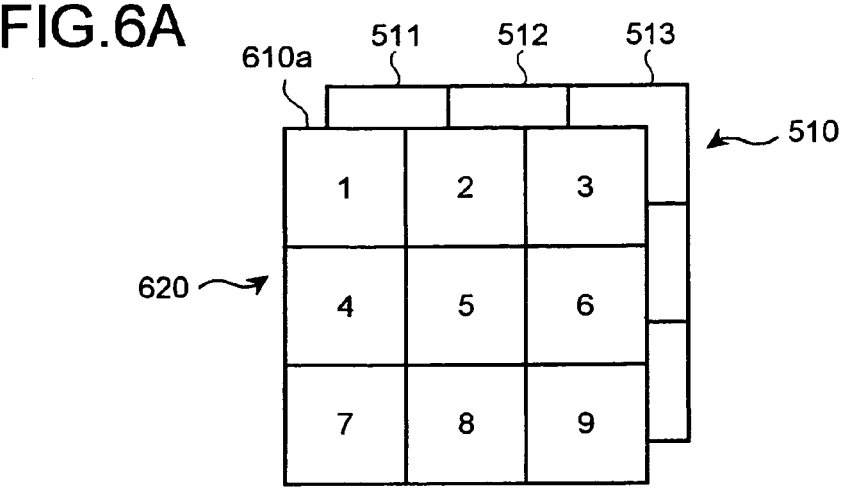
FIG. 6A is an illustration of embedding the first watermark information in the first still image.
Figure 6B:
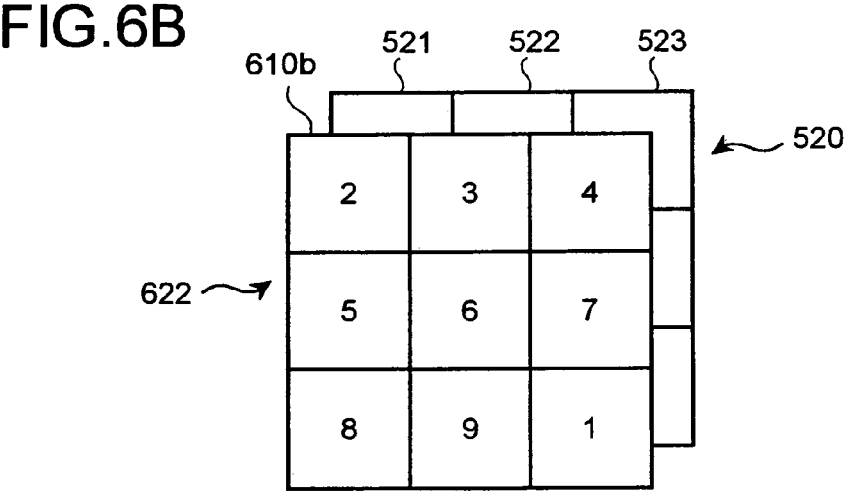
FIG. 6B is an illustration of embedding the second watermark information in a second still image.
Figure 6C:
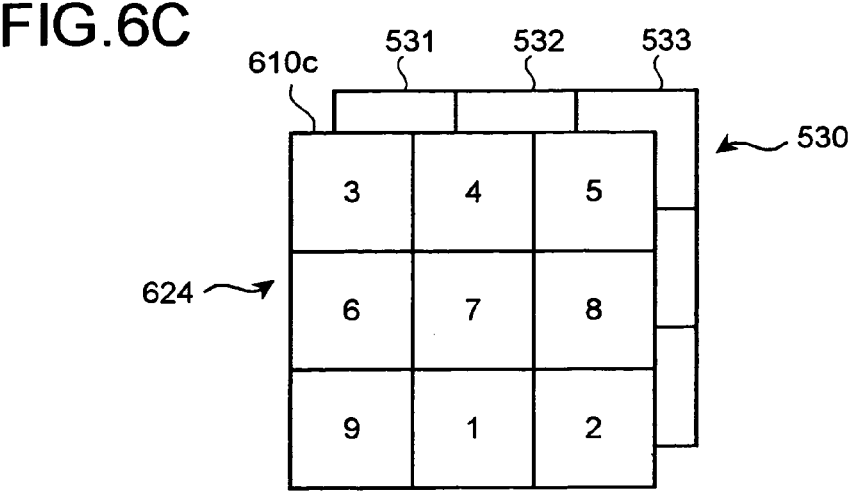
FIG. 6C is an illustration of embedding the third watermark information in a third still image.

The watermark element embedder 124 shown in FIG. 1 embeds each of the watermark information created by the watermark element arranger 122 in the respective still images. The processing by the watermark element embedder 124 will be explained in detail with reference to FIGS. 6A to 6C. FIG. 6A is a schematic diagram of a state in which the first watermark information 620 is embedded in the first still image 510. Likewise, FIG. 6B is a schematic diagram of a state in which the second watermark information 622 having the second watermark element 610b arranged at the top is embedded in the second still image 520. Further, FIG. 6C depicts a state in which the third watermark information 624 having the third watermark element 610c arranged at the top is embedded in the third still image 530.

The watermark element embedder 124 embeds the respective watermark information, in which the watermark element to be at the top is shifted by one, in a plurality of still images according to the sequence of the still images. Specifically, the watermark element embedder 124 embeds the respective watermark elements included in the watermark information, respectively, in the corresponding respective embedding areas. More specifically, by changing one bit of the least significant bits to 0 or 1, or two bits in the least significant bits to 00 or 11, the watermark element is embedded.

A blank data is embedded as the first watermark element, at a position corresponding to the first watermark element, so that the first watermark element in the watermark information can be recognized. As a result, when restoring the original watermark information 600 from the watermark information, the watermark element to be arranged at the top of the original watermark information 600 can be easily specified.

In the watermark information embedded in the respective still images, the sequence of the watermark elements in the original watermark information is maintained. Therefore, if the watermark element to be arranged at the top can be specified by the blank data, the original watermark information can be restored. For example, 01 and 10 in the two least significant bits may be designated as the blank data.

In the embodiment, since the watermark element to be arranged at the top can be specified by the blank data, the original watermark information can be exactly restored.

As a result, in the same embedding area in the continuous still images included in the moving image 500, a plurality of watermark elements are embedded in the same order as the sequence thereof in the original watermark information 600. For example, when taking notice of the watermark element arranged at the upper left of the still image, the watermark elements are embedded in the same order as the sequence in the original watermark information 600, such as the first watermark element 610a, the second watermark element 610b, the third watermark element 610c, . . . , according to the arrangement of the still images in order from the first still image.

The moving image recombiner 126 shown in FIG. 1 recombines respective still images in which the watermark information is embedded by the watermark element embedder 124, and creates a watermark information embedded moving image 700. The moving image recombiner 126 outputs the created watermark information embedded moving image 700. Specifically, the moving image recombiner 126 combines respective watermark information embedding areas to reorganize still images and obtains the watermark information embedded moving image 700 by combining respective still images.

In the watermark information embedded in the respective still images, the watermark element arranged at the top is different. That is, the watermark information embedded in the respective still images is respectively different information. Therefore, even if the watermark information embedded in one still image is decoded by a third party, other watermark information is not decoded.

The watermark elements included in the watermark information embedded in the respective still images are the same in the whole watermark information. Therefore, even when a part of the watermark element included in the watermark information embedded in a predetermined still image is missing, the watermark element in the missing part can be compensated by the watermark element embedded in another still image. That is, by compensating the missing part of the watermark information in one still image by the watermark information in another still image, the original watermark information 600 can be restored.

In the embodiment, the watermark elements included in the watermark information embedded in the respective still images are arranged in different embedding areas for each still image. Therefore, even when a predetermined part is missing uniformly over the still images, the original watermark information 600 can be restored based on the watermark element embedded in a area having no missing part in each still image.

Here, the case of uniformly missing the predetermined part is, for example, the case of uniformly missing the upper right area in each still image. More specifically, for example, it is the case of missing the second and the third embedding areas.

In the embodiment, the watermark element at the top in the watermark information embedded in the respective still images is shifted by one. The sequence of the watermark elements embedded in the respective still images is regularly different. Therefore, if one type of watermark information can be specified, the sequence of the watermark elements in the watermark information embedded in other still images can be specified according to the rule. As a result the watermark information to be embedded can be efficiently specified, by using the rule.

Figure 7:
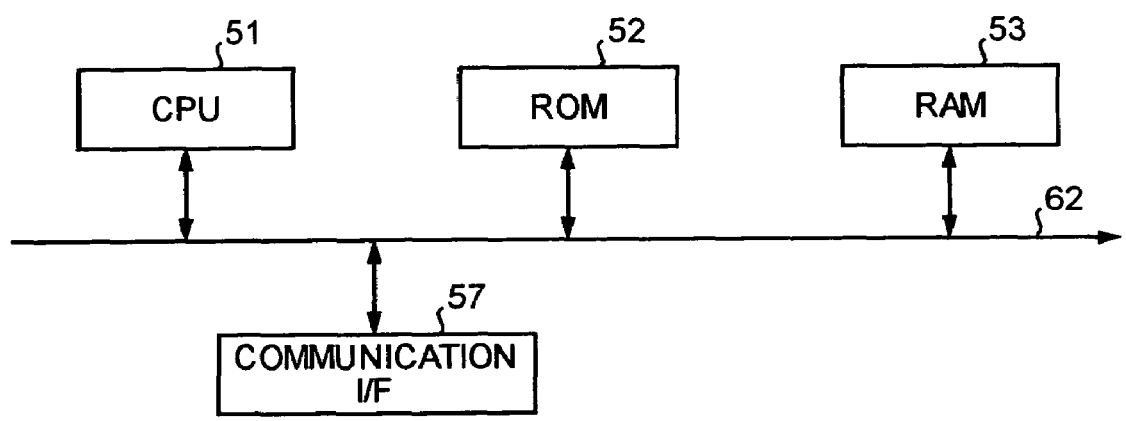
FIG. 7 depicts a hardware configuration of the digital watermark embedding apparatus according to the first embodiment.

FIG. 7 depicts the hardware configuration of the digital watermark embedding apparatus 100 according to the first embodiment. The digital watermark embedding apparatus 100 includes, as the hardware configuration, a read only memory (ROM) 52 that stores a digital watermark embedding program and the like for executing digital watermark embedding processing in the digital watermark embedding apparatus 100, a central processing unit (CPU) 51 that controls respective units of the digital watermark embedding apparatus 100 according to the program in the ROM 52 and executes buffering time changing processing and the like, a random access memory (RAM) 53 in which a work area is formed to store various kinds of data necessary for the control of the digital watermark embedding apparatus 100, a communication I/F 57 connected to the network for performing communication, and a bus 62 for connecting respective units.

The digital watermark embedding program in the digital watermark embedding apparatus 100 may be recorded on a computer readable recording medium such as a CD-ROM, a floppy disk (FD), and a digital versatile disk (DVD), in a file in an installable format or executable format.

In this case, the digital watermark embedding program is loaded on a main memory by reading the program from the recording medium and executing it in the digital watermark embedding apparatus 100, and respective units explained in the hardware configuration are generated on the main memory.

The digital watermark embedding program in the embodiment may be provided by storing the program on a computer connected to a network such as the Internet, and downloading the program via the network.

The digital watermark embedding apparatus 100 according to the embodiment has been explained, however, various modifications or improvements can be added to the above embodiment.

A first modification example will be explained. In the embodiment, the moving image divider 112 divides the moving image 500 into the still images 510, 520, and the like, and further divides the respective still images into nine embedding areas. The watermark element embedder 124 embeds one watermark element, respectively, with respect to the respective embedding areas. However, the moving image divider 112 may further divide the respective still images into a plurality of partial images, and divide the respective partial images into nine embedding areas.

Figure 8A:
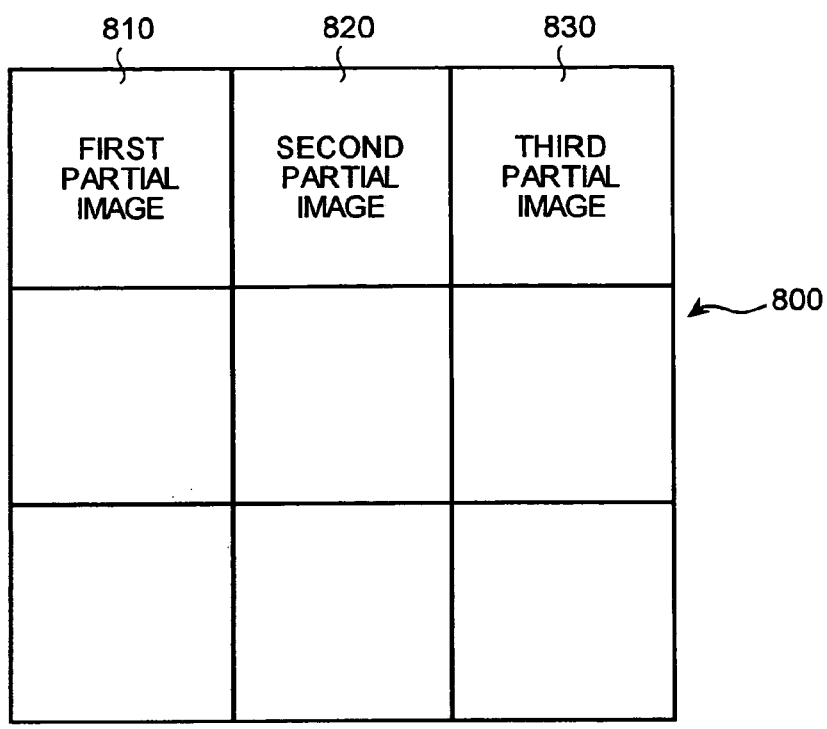
FIG. 8A depicts a data configuration of a still image according to a modification of the digital watermark embedding apparatus.
Figure 8B:
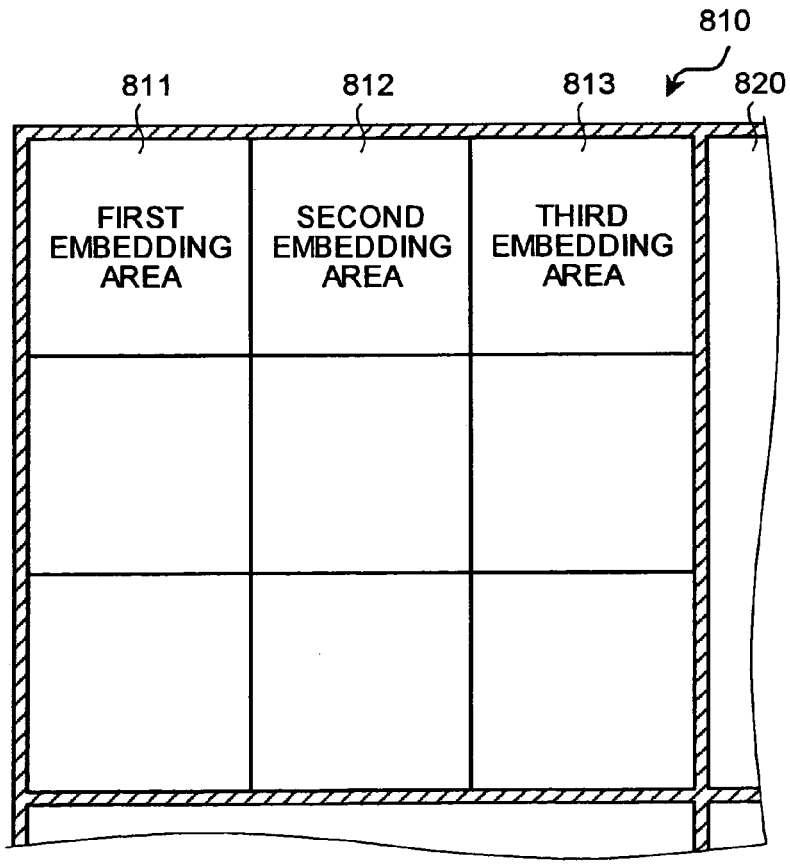
FIG. 8B is an enlarged view of a first partial image shown in FIG. 8A.

FIGS. 8A and 8B depict correspondence between a partial image when one piece of watermark information is embedded in one partial image, and the watermark information. FIG. 8A depicts the data configuration of the still image 800. FIG. 8B is an enlarged view of a first part still image 810 shown in FIG. 8A.

As shown in FIG. 8A, the one still image 800 has a plurality of partial images, that is, a first part still image 810, a second part still image 820, and the like. As shown in FIG. 8B, the partial image 810 has a plurality of embedding areas such as a first embedding area 811, a second embedding area 812, and the like.

In this embodiment, one watermark element is respectively embedded in the respective embedding areas 811, 812, and the like. That is, one watermark information is respectively embedded in the respective partial images 810, 820, and the like.

Thus, even when one of the watermark information is embedded in the respective partial images, it can be avoided that the original watermark information is decoded by a third party, as in the first embodiment. Further, even when the original watermark information cannot be restored from the watermark elements embedded in one partial image, the missing part can be compensated by the watermark elements embedded in other partial images, to restore the original watermark information.

The moving image divider 112 divides the moving image 500 into nine embedding areas in a lattice form, in the embodiment. However, as a second modification example, the division unit for the embedding areas is not limited to the number shown in the embodiment. That is, the sequence in the still image in the respective embedding areas needs only to be predetermined, and the number and the size of the embedding areas are not particularly limited. For example, the moving image may be divided into four embedding areas vertically and horizontally, in total, 16 embedding areas.

The moving image need not be divided equally, and for example, may be divided into embedding areas having different sizes. Also in this case, one watermark element needs to be embedded with respect to the respective embedding areas included in the respective still images, as in the embodiment.

FIG. 9 depicts a still image 900 divided into embedding areas having different sizes. The embedding areas arranged in the upper two stages 912 and 914 and the embedding areas arranged in the lowermost stage 920 in the still image 900 shown in FIG. 9 have different sizes. In this drawing, the embedding areas arranged in the lowermost stage are provided in a size four times as large as the size of the embedding areas arranged in the upper two stages.

Also in this example, the respective watermark elements need to be embedded according to the arrangement of the embedding areas, in order from the upper left, as in the embodiment. FIGS. 10A to 10C respectively depict watermark information 950, 960, and 970 to be embedded in the respective still images.

As shown in FIG. 10A, in the first watermark information 950, the first watermark element is embedded at a position corresponding to a first embedding area. The respective watermark elements are arranged sequentially, following the first watermark element. As shown in FIGS. 10B and 10C, in the second and the third still images, the second watermark element and the third watermark element are respectively embedded at a position corresponding to the first embedding area.

In this manner, even when the moving image is divided into embedding areas having different sizes, the same watermark element is arranged at a different position in the respective still images. Therefore, even when a part of the watermark element is missing over a plurality of still images, the original watermark information 600 can be restored by compensating the missing part by the watermark element embedded in another part, as in the example in which the moving image is divided into the embedding areas having the same size at equal intervals.

A third modification example will be explained. In the embodiment, by shifting by one the watermark element to be arranged at the top, according to the sequence of the watermark elements in the original watermark information 600, a plurality of watermark information different from one another are created. However, the rule for differentiating the respective watermark information is not limited to the one explained in the embodiment. For example, the watermark element to be arranged at the top may be shifted by two. Further, the sequence of the watermark elements in the respective watermark information may be made different by using a predetermined function. Thus, it is only necessary that the sequence of the watermark elements in the original watermark information 600 can be restored from the sequence of the watermark elements in the watermark information, and the rule is not particularly limited so long as restoration is possible.

In the embodiment, the watermark element arranger 122 creates the watermark information in which the sequence in the original watermark information 600 is maintained. However, as a fourth modification example, the sequence in the original watermark information 600 may not be maintained in the watermark information.

It is only necessary that the relationship between the sequence of the watermark elements in the original watermark information 600 and the sequence of the watermark elements in the watermark information to be embedded is determined beforehand, and the sequence in the original watermark information 600 can be restored from the sequence in the watermark information based on the relationship, and the sequence is not limited to the one same as the sequence in the original watermark information 600.

In this case, it is necessary to hold the relationship between the sequence of the watermark elements in the original watermark information 600 and the sequence of the watermark elements in the watermark information to be embedded. The watermark element arranger 122 re-arranges the watermark elements according to the relationship, to create the watermark information to be embedded.

In the embodiment, the blank data is embedded as the first watermark element. However, as a fifth modification example, the first watermark element may be data other than the blank data, so long as an apparatus that detects the watermark information to be embedded can recognize the first watermark element.

In the embodiment, the original watermark information divider 121 obtains the original watermark information 600 from outside, and the watermark element arranger 122 determines the sequence of watermark elements. However, as a sixth modification example, the watermark elements in the sequence determined by the watermark element arranger 122 may be held beforehand.

Figure 11:
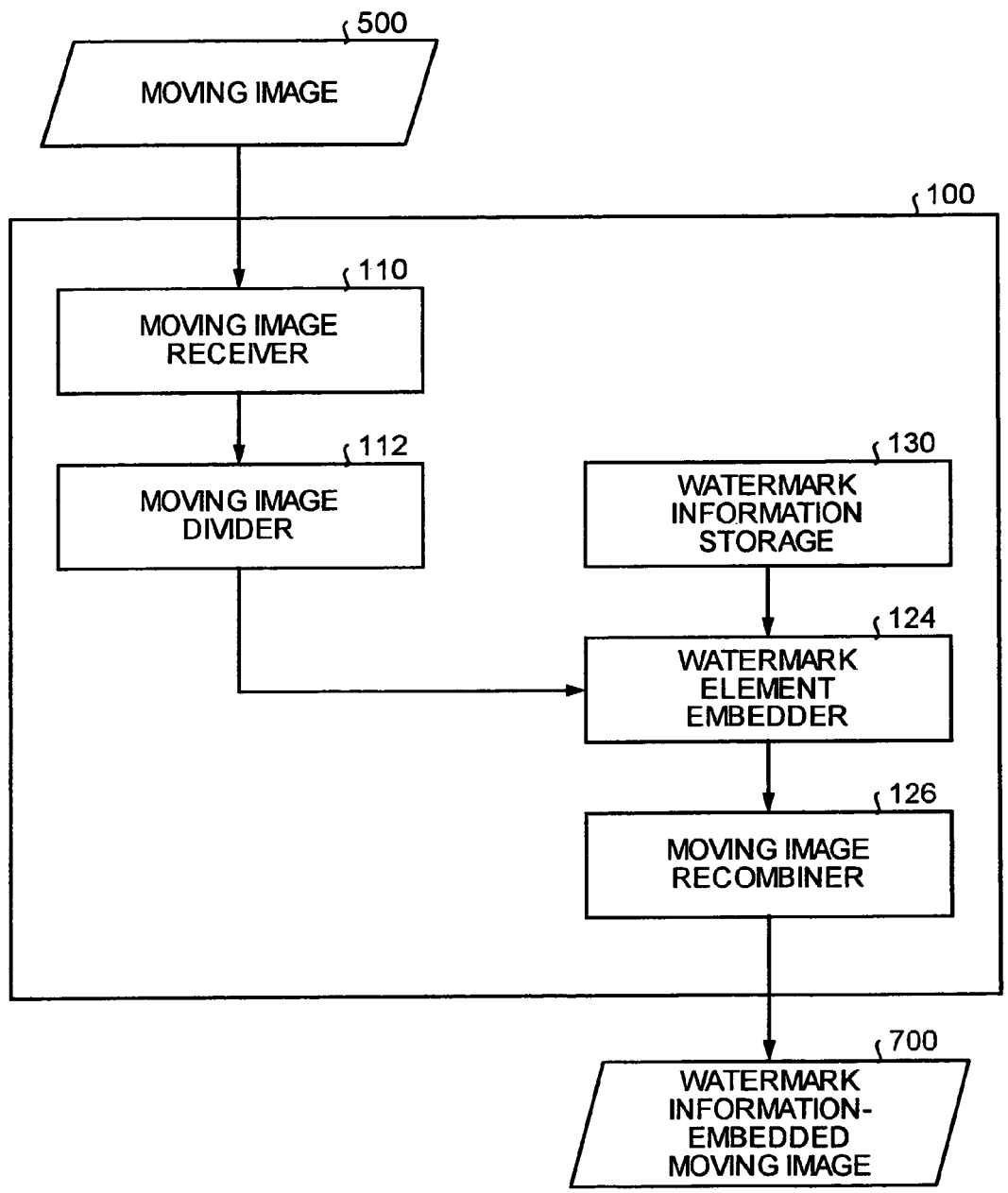
FIG. 11 is a block diagram of a digital watermark embedding apparatus according to still another modification.

FIG. 11 is a functional configurational diagram of the digital watermark embedding apparatus 100 in this example. The digital watermark embedding apparatus 100 has a watermark information holding unit 130, instead of the original watermark information receiver 120, the original watermark information divider 121, and the watermark element arranger 122. The watermark information holding unit 130 holds a plurality of watermark information determined by the watermark element arranger 122 beforehand. The watermark element embedder 124 embeds the watermark information held in the watermark information holding unit 130 in the respective still images divided by the moving image divider 112.

The configuration and the processing of the digital watermark embedding apparatus 100 other than those described above are the same as those of the digital watermark embedding apparatus 100 according to the embodiment.

Figure 12:
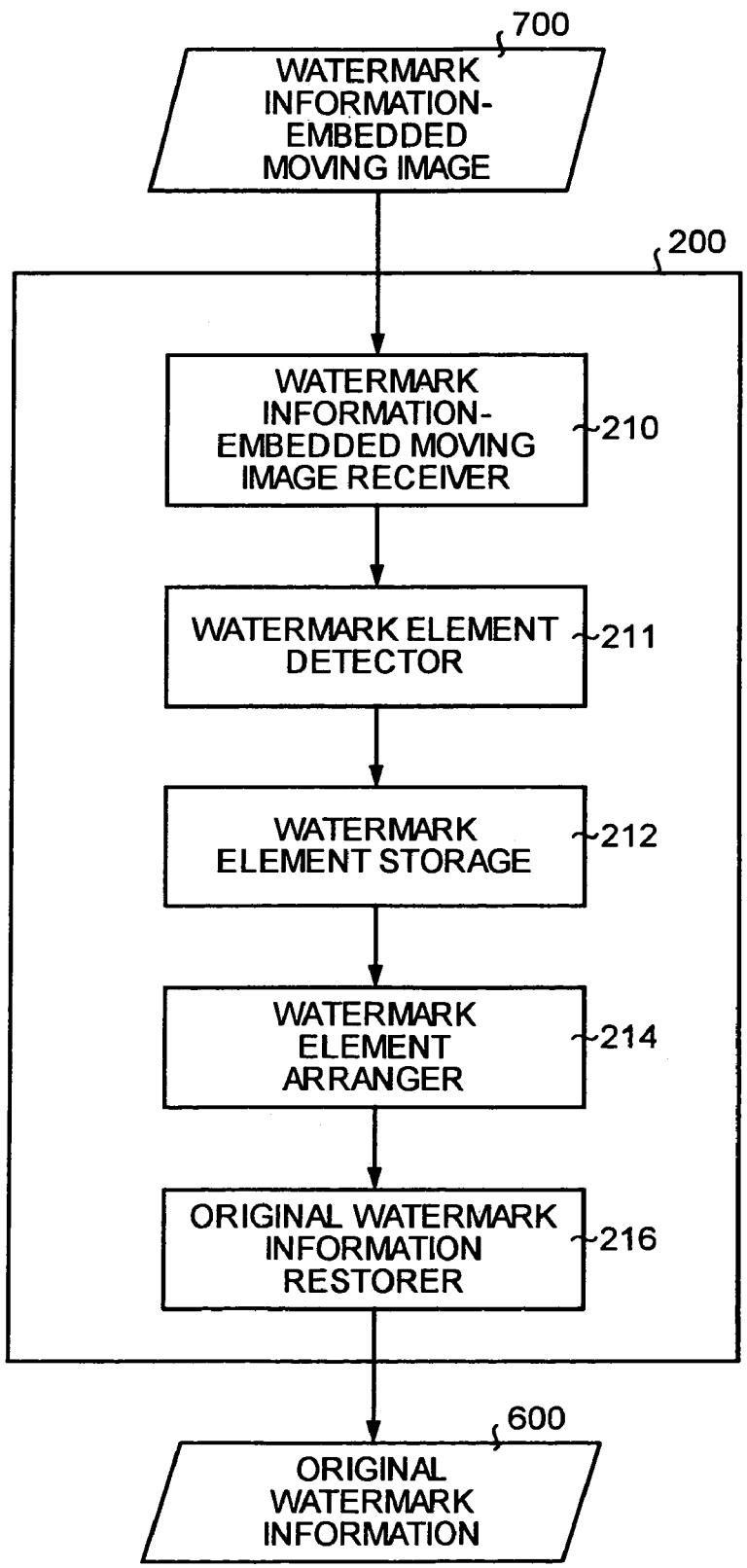
FIG. 12 is a block diagram of a digital watermark detector.

A digital watermark detector 200 according to the embodiment will be explained below. The digital watermark detector 200 detects the watermark information embedded by the digital watermark embedding apparatus 100 to restore the original watermark information 600 from the watermark information. FIG. 12 is a block diagram of the functional configuration of the digital watermark detector 200. The digital watermark detector 200 has a watermark information-embedded moving image receiver 210, a watermark element detector 211, a watermark element storage unit 212, a watermark element arranger 214, and an original watermark information restorer 216.

The watermark information-embedded moving image receiver 210 obtains a watermark information-embedded moving image 700 from outside. The watermark element detector 211 obtains the respective still images included in the watermark information-embedded moving image 700 from the watermark information-embedded moving image receiver 210, according to the sequence in the watermark information-embedded moving image 700. The watermark element embedded in the still image is detected from the obtained respective still images.

The watermark element storage unit 212 stores the respective watermark elements detected from the watermark information-embedded moving image 700 by the watermark element detector 211. The watermark element detected from the next still image is then stored. In this manner, by storing the watermark elements detected from the respective still images, all watermark elements included in the original watermark information are stored.

Figure 13:
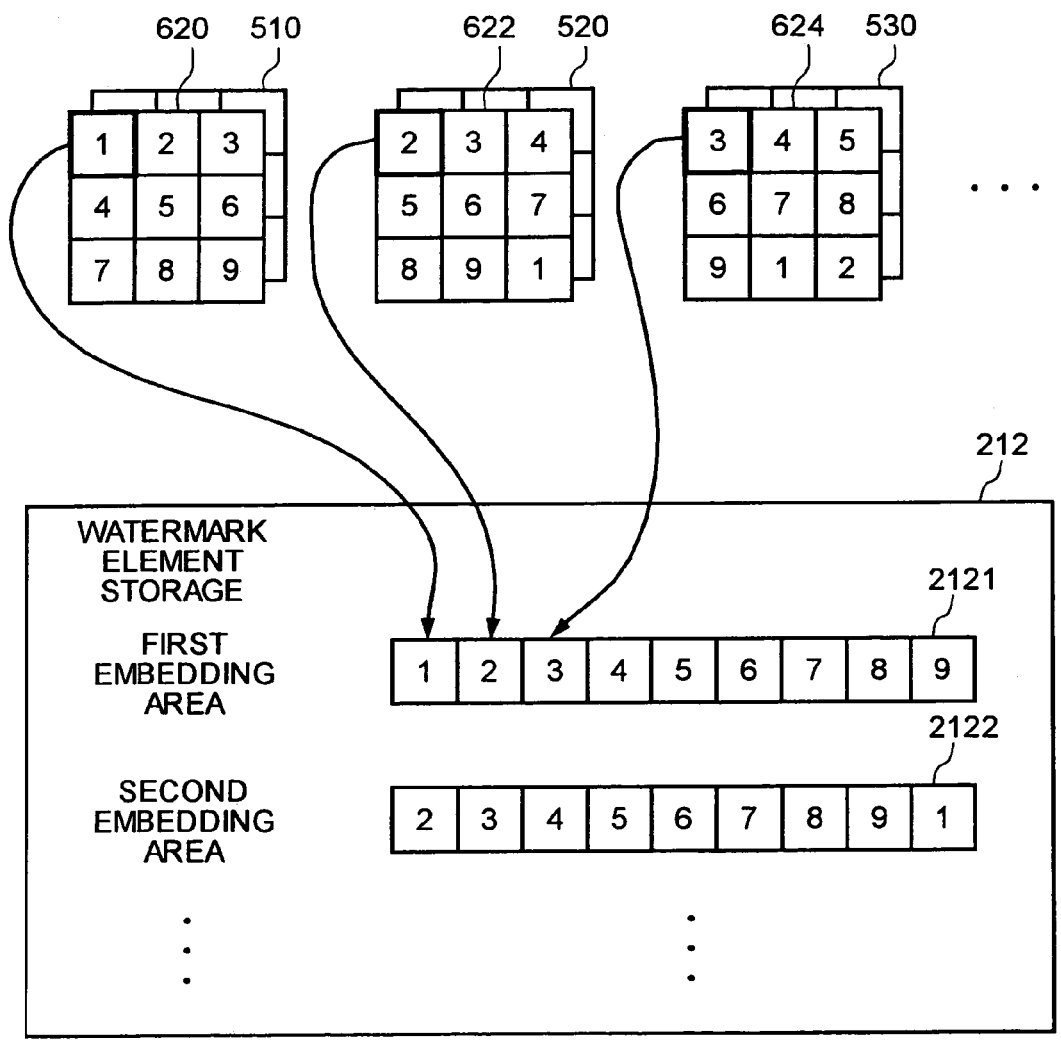
FIG. 13 is an illustration of storing a watermark element in a watermark element storage.

FIG. 13 is an explanatory diagram of the processing for storing the watermark element by the watermark element storage unit 212. An example in which a part of a still image is missing, and the watermark element can be detected only from a part of the area in the respective still images will be explained, with reference to FIG. 13. In this case, the watermark element storage unit 212 sequentially stores the watermark elements embedded in the first embedding area in the respective still images in a first storage unit 2121. Likewise, the watermark element storage unit 212 sequentially stores the watermark elements embedded in the second embedding area in a second storage unit 2122.

In this manner, when the watermark elements are stored according to the sequence of the detected still images in the respective embedding areas, the stored watermark elements are stored according to the sequence in the original watermark information 600.

Therefore, by detecting the watermark elements embedded in the respective embedding areas from the respective still images, and storing these, all watermark elements constituting the watermark elements can be obtained from the respective embedding areas.

Therefore, for example, even when the images in the ninth embedding area are missing uniformly in the watermark information-embedded moving image 700, the original watermark information 600 can be accurately restored based on the watermark elements detected from the first embedding area, that is, the watermark elements stored in the first storage unit 2121.

The respective still images constituting the moving image 500 include all watermark elements constituting the original watermark information 600. Therefore, when all watermark elements cannot be detected from a predetermined still image, the watermark element that cannot be detected can be detected from other still images. That is, even when all watermark elements cannot be detected from a predetermined still image, all watermark elements included in the original watermark information can be stored by compensating it with watermark elements detected from other still images.

The watermark element arranger 214 shown in FIG. 12 specifies a watermark element to be arranged at the top, from the watermark elements stored in the watermark element storage unit 212. Specifically, the blank data is detected. Further, the watermark element arranger 214 specifies a watermark element to be arranged at the top, from the watermark elements detected from a predetermined embedding area. In the digital watermark embedding apparatus 100, since the blank data is embedded as the first watermark element, the watermark element arranger 214 can specify the first watermark element by detecting the blank data.

Figure 14:
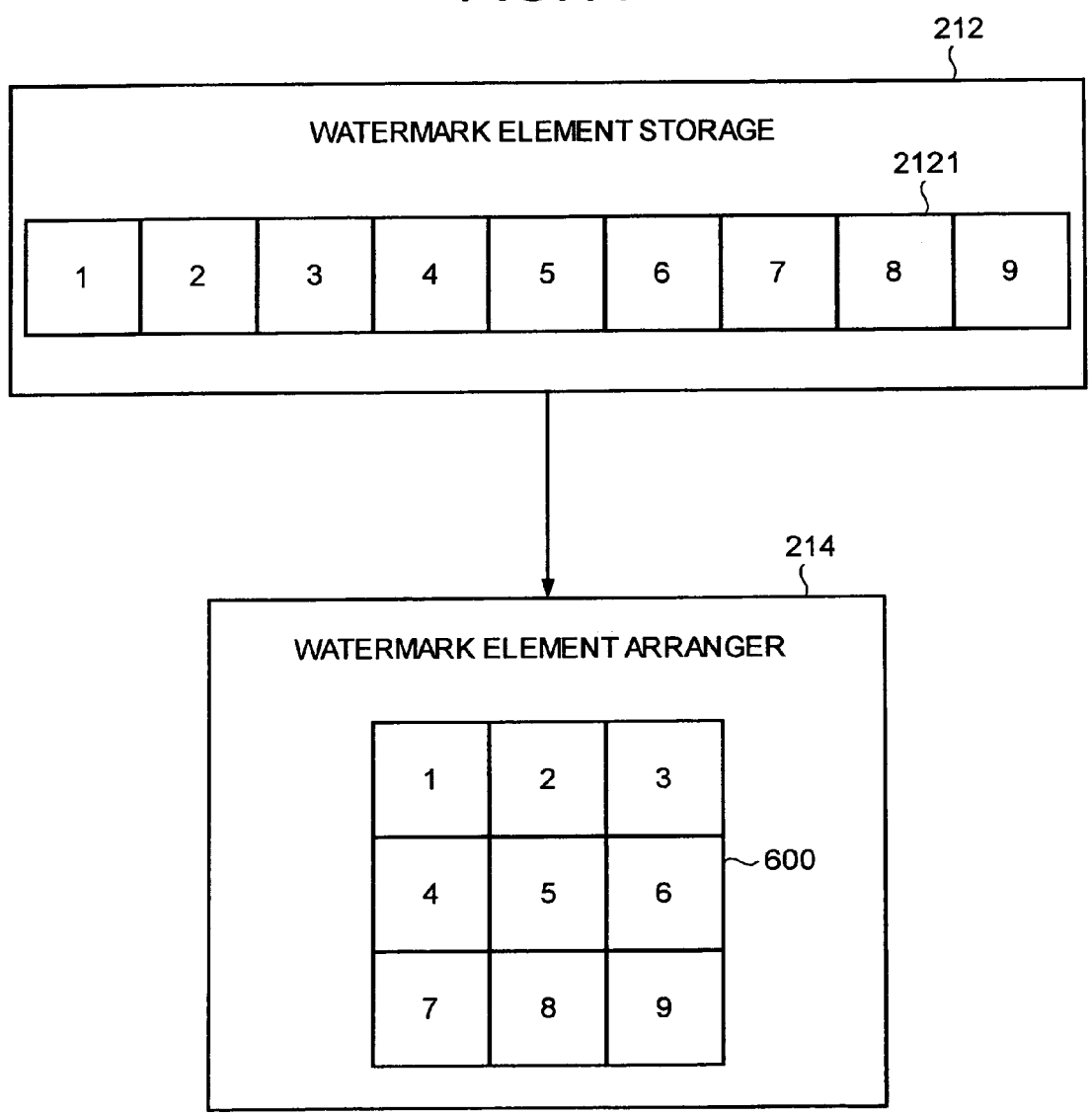
FIG. 14 is a schematic diagram of the processing in which a watermark element arranger restores original watermark information from the watermark elements stored in a first storage.

The watermark element arranger 214 shifts the sequence of the watermark elements so that the specified first watermark element comes to the top of the sequence. FIG. 14 is a schematic diagram of the processing in which the watermark element arranger 214 restores the original watermark information 600 from the watermark elements stored in the first storage unit 2122. In this manner, the original watermark information 600 is restored from the sequence of the watermark element. The original watermark information restorer 216 performs a predetermined calculation to the watermark elements arranged by the watermark element arranger 214 to obtain the original watermark information.

The digital watermark detector 200 detects the watermark elements from a moving image in which the watermark information is embedded by the digital watermark embedding apparatus 100, to restore the original watermark information according to the above configuration.

The hardware configuration of the digital watermark detector 200 is the same as that of the digital watermark embedding apparatus 100 explained with reference to FIG. 7.

The digital watermark embedding apparatus 100 and the digital watermark detector 200 according to the embodiment have been explained, but various modifications or improvements can be added thereto.

Figure 15:
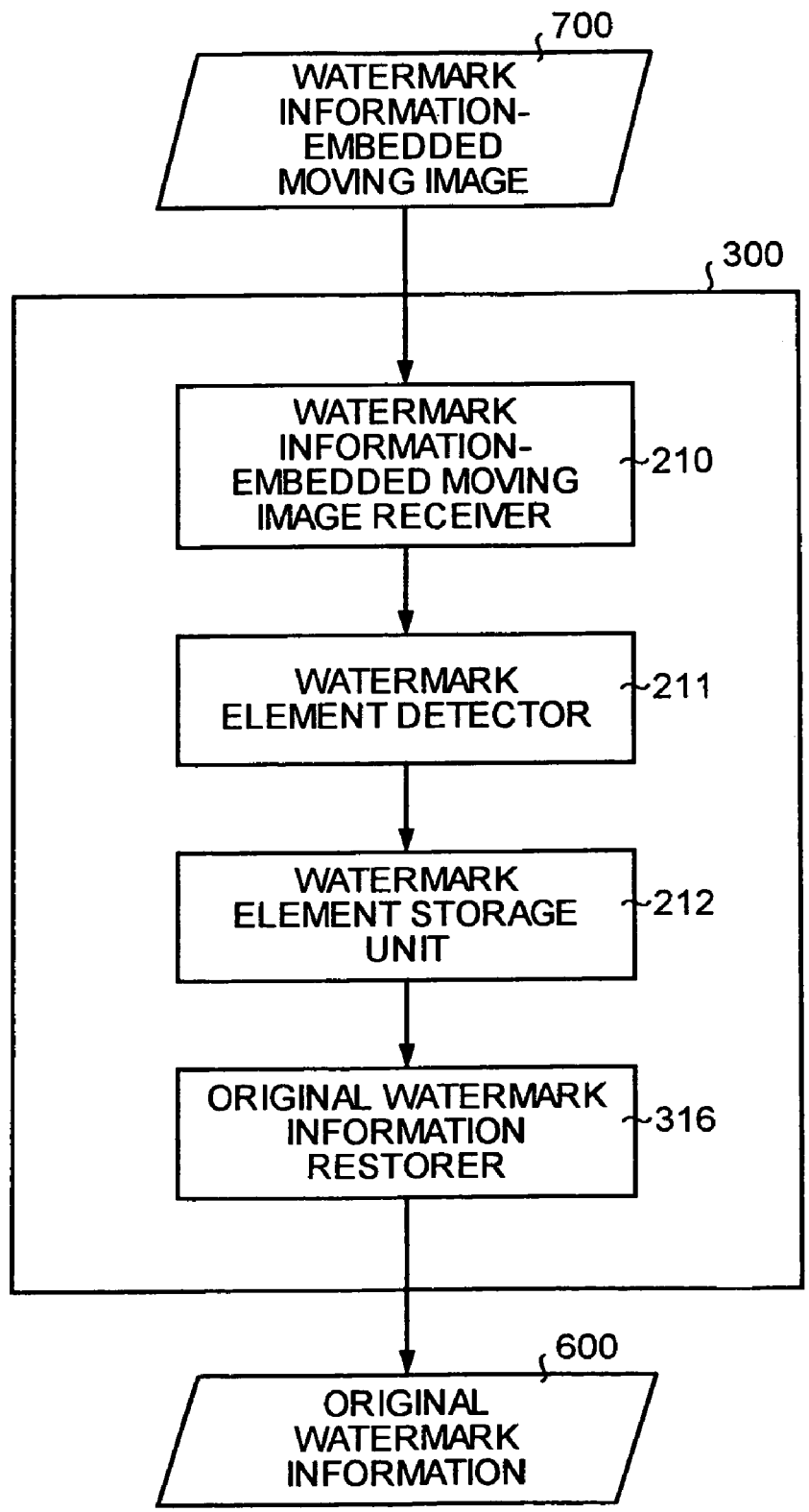
FIG. 15 is a block diagram of a modification of the digital watermark detector.

As a first modification example, the digital watermark detector 200 may restore the original watermark information by using a topological invariant FIG. 15 is a block diagram of the functional configuration of the digital watermark detector 300 according to this example. In the digital watermark detector 300 according to this example, the watermark element arranger 214 is not provided, and the original watermark information restorer 316 can restore the original watermark information without specifying the watermark element arranged at the top in the watermark information. The digital watermark detector 300 according to this example is different from the digital watermark detector 300 in the embodiment at this point.

The original watermark information restorer 316 in the digital watermark detector 300 in this example restores the original watermark information by using the topological invariant. By regarding a local geometrical distortion as homeomorphism, the digital watermark can be associated with the topological invariant. Here, the topological invariant stands for an invariant property under a local geometrical distortion, and for example, a homotopy class is known.

The original watermark information can be restored without specifying the watermark element arranged at the top included in the watermark information, by using a topological watermarking using the topological invariant (see Japanese Patent No. 3431593). Therefore, the original watermark information can be restored without specifying the watermark element arranged at the top included in the watermark information by the watermark element arranger 214, as explained in the embodiment.

Determination of reliability may be performed from the watermark element obtained repeatedly. Specifically, a plurality of watermark elements obtained in the respective still images may be collated. Alternatively, the watermark elements obtained in the respective still images may be collated with a plurality of watermark elements obtained in the time base direction. Further, these types of collation may be combined.

Since the processing can be finished at a point when the original watermark information is calculated, the processing can be efficiently performed.

A modification example according to the embodiment will be explained. In the embodiment, an example in which the object to be embedded with the watermark information is the moving image 500 is explained, but the object to be embedded with the watermark information is not limited thereto. For example, the information may be voice information or information including both images and voice. Thus, the contents need only to be the information including the concept of the time base.

The object to be embedded with the watermark information may be a still image. In this case, the still image is divided into a plurality of partial images, and the respective partial images are processed as the still image in the embodiment. In other words, one of the watermark information needs only to be embedded in the respective partial images.

A second modification example will be explained. The watermark element arranger 214 in the embodiment restores the original watermark information 600 based on the sequence of the watermark elements detected from a predetermined embedding area, of the sequence of watermark elements detected from the respective embedding areas stored in the watermark element storage unit 212. Instead of this, the original watermark information 600 may be restored based on the respective watermark elements detected from a plurality of embedding areas. For example, when the first to the eighth watermark elements are detected from the first embedding area, and the ninth watermark element is detected from the second embedding area, the original watermark information 600 may be restored based on the first to the eighth watermark elements detected from the first embedding area, and the ninth watermark element detected from the second embedding area.

The digital watermark embedding apparatus according to the present invention embeds the watermark information, respectively, in the respective partial images included in the image. The watermark information to be embedded in the respective partial images is such that the watermark elements constituting the respective watermark information are the same, but the sequence of the watermark elements is different. Thus, since the same watermark elements are embedded in the respective partial images, the watermark information can be restored based on the watermark elements embedded in the different partial images. Further, even when a part of the image is missing, the watermark information can be restored highly accurately.

The other objects, features, and advantages of the present invention are specifically set forth in or will become apparent from the following detailed description of the invention when read in conjunction with the accompanying drawings.

What is claimed is:

1. An apparatus for embedding digital watermark information in an image, comprising:
   an image divider dividing the image into a plurality of partial images;
   a watermark information divider dividing the digital watermark information into watermark elements;
   a watermark element arranger creating a plurality of digital watermarks which maintain the regularity of a cyclic sequence and are different in a sequence of the watermark elements; and
   an embedder embedding in each of the partial images a digital watermark which indicates the digital watermark information, the digital watermark including a plurality of the watermark elements arranged in a sequence which is different for each of the partial images.

2. The apparatus according to claim 1, wherein
   the image divider further divides each of the partial images into a plurality of embedding areas, and
   the embedder embeds each of the watermark elements in a respective one of the embedding areas.

3. The apparatus according to claim 1, wherein the sequence is different in a predetermined watermark element for each digital watermark.

4. The apparatus according to claim 1, wherein the sequence is different in all watermark elements for each digital watermark.

5. The apparatus according to claim 1, wherein each digital watermark is associated with a position of each of the partial images in the image.

6. The apparatus according to claim 1, wherein the sequence maintains a common order of the watermark elements.

7. The apparatus according to claim 6, wherein the sequence is different for each digital watermark in that a top of the sequence of the watermark elements is shifted by a predetermined amount.

8. The apparatus according to claim 7, wherein a watermark element corresponding to a top of the common order is specific data.

9. The apparatus according to claim 1, wherein the image divider divides the image into the plurality of partial images each having an equal area.

10. The apparatus according to claim 1, wherein the image is a moving image including a plurality of still images, and the partial image is a still image.

11. An apparatus for detecting digital watermark information embedded in an image, comprising:
    a receiver receiving an image which includes a plurality of partial images each embedded with a digital watermark, the digital watermark indicating the digital watermark information and including a plurality of watermark elements arranged in a cyclic sequence which is different for each digital watermark;
    a detector detecting the watermark elements from each partial image;
    a storage unit storing the watermark elements detected; and
    a watermark information restorer restoring the digital watermark information, based on the watermark elements detected from the partial images, of the watermark elements stored in the storage unit.

12. The apparatus according to claim 11, wherein
    each of the partial images has a plurality of embedding areas,
    the storage unit stores the watermark elements detected from the partial images, for each embedding area, and
    the watermark information restorer restores the digital watermark information, based on the watermark elements detected from a same embedding area in the partial images, of the watermark elements stored in the storage unit.

13. The apparatus according to claim 11, wherein when the detector does not detect all watermark elements included in the watermark information, from a predetermined partial image, the digital watermark information restorer restores the digital watermark information, based on a watermark element detected from a different partial image, of the watermark elements stored in the storage unit.

14. A method of embedding digital watermark information in an image, comprising:
    dividing the image into a plurality of partial images;
    dividing the digital watermark information into watermark elements;
    creating a plurality of digital watermarks which maintain the regularity of a cyclic sequence and are different in a sequence of the watermark elements; and
    embedding in each of the partial images a digital watermark which indicates the digital watermark information, the digital watermark including a plurality of the watermark elements arranged in a sequence which is different for each of the partial images.

15. A method of detecting digital watermark information embedded in an image, comprising:
    receiving an image which includes a plurality of partial images each embedded with a digital watermark, the digital watermark indicating digital watermark information and including a plurality of watermark elements arranged in a cyclic sequence which is different for each digital watermark;
    detecting the watermark elements from each partial image;
    storing the watermark elements detected; and
    restoring the digital watermark information, based on the watermark elements detected from the partial images, of the watermark elements stored.

16. A computer program product including computer executable instructions stored on a computer readable medium, wherein the instructions, when executed by a computer, cause the computer to perform:
    dividing an image into a plurality of partial images;
    dividing the digital watermark information into watermark elements;
    creating a plurality of digital watermarks which maintain the regularity of a cyclic sequence and are different in a sequence of the watermark elements; and
    embedding in each of the partial images a digital watermark which indicates digital watermark information, the digital watermark including a plurality of the watermark elements arranged in a sequence which is different for each of the partial images.

17. A computer program product including computer executable instructions stored on a computer readable medium, wherein the instructions, when executed by a computer, cause the computer to perform:
    receiving an image which includes a plurality of partial images each embedded with a digital watermark, the digital watermark indicating digital watermark information and including a plurality of watermark elements arranged in a cyclic sequence which is different for each digital watermark;

detecting the watermark elements from each partial image;

storing the watermark elements detected; and restoring the watermark information, based on the watermark elements detected from the partial images, of the watermark elements stored.

18. The apparatus according to claim 1, wherein the image is a still image, and the partial image is a partial area in the still image.

* * * * *